United States Patent
Chen et al.

(10) Patent No.: US 12,516,075 B2
(45) Date of Patent: Jan. 6, 2026

(54) PHOSPHORUS-CONTAINING COMPOUND AND PREPARATION METHOD THEREOF

(71) Applicant: Elite Material Co., Ltd., Taoyuan (TW)

(72) Inventors: Chien-Hsiang Chen, Taoyuan (TW); Chun-Hsiung Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 404 days.

(21) Appl. No.: 18/322,323

(22) Filed: May 23, 2023

(65) Prior Publication Data

US 2023/0391806 A1    Dec. 7, 2023

Related U.S. Application Data

(60) Provisional application No. 63/348,695, filed on Jun. 3, 2022.

(51) Int. Cl.
*C07F 9/12* (2006.01)

(52) U.S. Cl.
CPC ..................... *C07F 9/12* (2013.01)

(58) Field of Classification Search
CPC ........................................... C07F 9/12
See application file for complete search history.

(56) References Cited

U.S. PATENT DOCUMENTS 5,959,135 A * 9/1999 Garner ............... C07C 253/10
558/338

* cited by examiner

*Primary Examiner* — Shawquia Jackson
(74) *Attorney, Agent, or Firm* — Muncy, Geissler, Olds & Lowe, P.C.

(57) ABSTRACT

A phosphorus-containing compound of Formula (1) and a preparation method thereof are provided. The phosphorus-containing compound is a compound having a reactive functional group and containing a phosphorus atom in its structure. The preparation method includes: (1) reacting magnolol and phosphoryl chloride in a first alkaline environment to obtain an intermediate product; and (2) reacting the intermediate product and a benzenediol in a second alkaline environment to obtain the phosphorus-containing compound.

Formula (1)

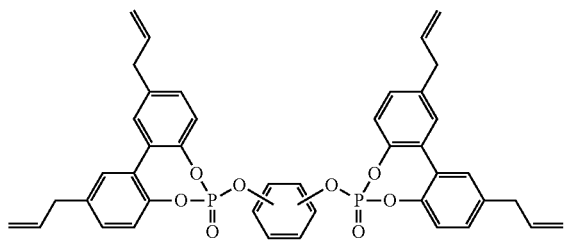

13 Claims, 1 Drawing Sheet

PHOSPHORUS-CONTAINING COMPOUND AND PREPARATION METHOD THEREOF

CROSS-REFERENCE TO RELATED APPLICATION

This application claims the priority benefits of U.S. provisional application No. 63/348,695, filed on Jun. 3, 2022. The entirety of the above-mentioned patent application is hereby incorporated by reference herein and made a part of this specification.

BACKGROUND

1. Field of the Disclosure

The present disclosure primarily relates to a phosphorus-containing compound and a preparation method thereof, more particularly to a phosphorus-containing compound having a reactive functional group and a preparation method thereof.

2. Description of Related Art

Phosphorus-containing compounds have many uses; for example but not limited thereto (hereinafter abbreviated as "for example"), they can be used as halogen-free eco-friendly flame retardants. Because phosphorus-containing compounds will produce phosphoric acid during heating and combustion, a coke layer will be formed to insulate combustibles against oxygen; during heating and combustion, phosphorus-containing compounds can also capture free radicals formed during the combustion reaction to inhibit substance degradation to inhibit further combustion. However, common phosphorus-containing compounds do not have a reactive functional group and can not engage crosslinking with a reactive functional group-containing compound; for example, 9,10-dihydro-9-oxa-10-phospha-phenanthrene-10-oxide (DOPO) is a phosphorus-containing compound without a reactive functional group. Some phosphorus-containing compounds have a reactive hydroxyl group, which undesirably increases the water absorption rate and deteriorates material properties; for example, 10-(2,5-dihydroxyphenyl)-10H-9-oxa-10-phosphaphenanthrene-10-oxide and DOPO-containing bisphenol A novolac resin both contain a reactive hydroxyl group, and therefore both aforesaid phosphorus-containing compounds may result in the increase of water absorption property of the material.

In addition, phosphorus-containing compounds having a reactive hydroxyl group are unable to engage crosslinking with a vinyl group-containing compound. Therefore, it is desirable to develop a vinyl group-containing phosphorus-containing compound to achieve the crosslinking between the vinyl group-containing phosphorus-containing compound and the vinyl group-containing compound.

SUMMARY

A main object of the present disclosure is to provide a novel vinyl group-containing phosphorus-containing compound. Specifically, a main object of the present disclosure is to provide a vinyl group-containing compound having a phosphorus atom in its structure.

Another main object of the present disclosure is to provide a method of preparing the aforesaid phosphorus-containing compound.

The phosphorus-containing compound according to the present disclosure has a structure represented by Formula (1):

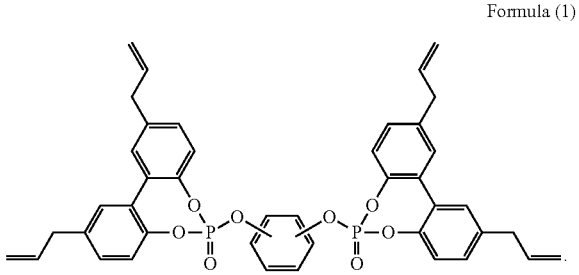

Formula (1)

In one embodiment, the phosphorus-containing compound according to the present disclosure comprises a phosphorus-containing compound of Formula (2), a phosphorus-containing compound of Formula (3) or a combination thereof:

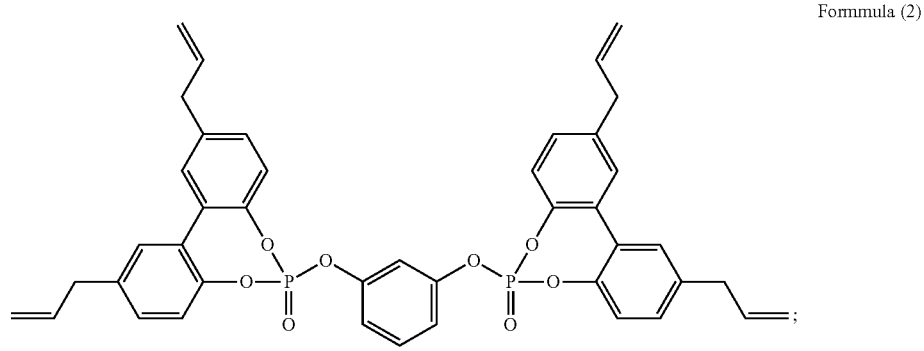

Formmula (2)

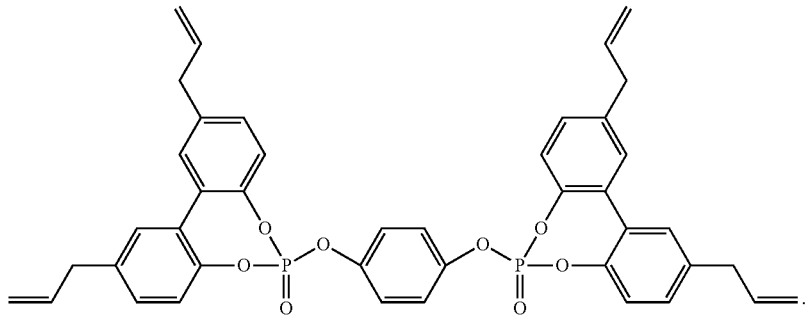

Formula (3)

On the other hand, the method of preparing the phosphorus-containing compound according to the present disclosure comprises the following steps:
(1) reacting magnolol with phosphoryl chloride ($POCl_3$) in a first alkaline environment to obtain an intermediate product; and
(2) reacting the intermediate product with a benzenediol in a second alkaline environment to obtain the phosphorus-containing compound.

In one embodiment, the first alkaline environment and the second alkaline environment individually comprise the following alkaline compounds: triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof.

In one embodiment, the benzenediol comprises resorcinol, hydroquinone or a combination thereof.

In one embodiment, the step (1) and the step (2) are individually performed at a temperature range of 0° C. to 20° C.

In one embodiment, the step (1) is performed in the presence of a first solvent, and the step (2) is performed in the presence of a second solvent.

In one embodiment, the first solvent and the second solvent individually comprise toluene, tetrahydrofuran, acetone, butanone, propylene glycol methyl ether, dimethylformamide, dimethylacetamide, xylene or a combination thereof.

In one embodiment, the molar ratio of magnolol and phosphoryl chloride is between 2:1 and 1:2, and the molar ratio of the intermediate product and the benzenediol is between 2:1 and 4:1.

In one embodiment, the method of preparing the phosphorus-containing compound according to the present disclosure comprises the following steps:
dissolving magnolol in tetrahydrofuran to obtain a tetrahydrofuran solution of magnolol;
at a temperature of 0° C. to 20° C., adding a first alkaline compound to the tetrahydrofuran solution of magnolol to obtain a first solution;
adding a toluene solution of phosphoryl chloride to the first solution to obtain the intermediate product;
dissolving the benzenediol in tetrahydrofuran to obtain a tetrahydrofuran solution of the benzenediol;
at a temperature of 0° C. to 20° C., adding a second alkaline compound to the tetrahydrofuran solution of the benzenediol to obtain a second solution; and
adding the intermediate product to the second solution to obtain the phosphorus-containing compound.

In one embodiment, steps in the method of preparing the phosphorus-containing compound according to the present disclosure are not bound to a certain order or sequence if no order or sequence is specifically designated. For example, but not limited thereto, in another embodiment, the method of preparing the phosphorus-containing compound according to the present disclosure comprises the following steps:
dissolving the benzenediol in tetrahydrofuran to obtain a tetrahydrofuran solution of the benzenediol;
at a temperature of 0° C. to 20° C., adding a second alkaline compound to the tetrahydrofuran solution of the benzenediol to obtain a third solution;
dissolving magnolol in tetrahydrofuran to obtain a tetrahydrofuran solution of magnolol;
at a temperature of 0° C. to 20° C., adding a first alkaline compound to the tetrahydrofuran solution of magnolol to obtain a fourth solution;
adding a toluene solution of phosphoryl chloride to the fourth solution to obtain the intermediate product; and
adding the intermediate product to the third solution to obtain the phosphorus-containing compound.

In one embodiment, the first alkaline compound and the second alkaline compound individually comprise triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof; and the benzenediol comprises resorcinol, hydroquinone or a combination thereof.

DESCRIPTION OF THE EMBODIMENTS

Figure 1:
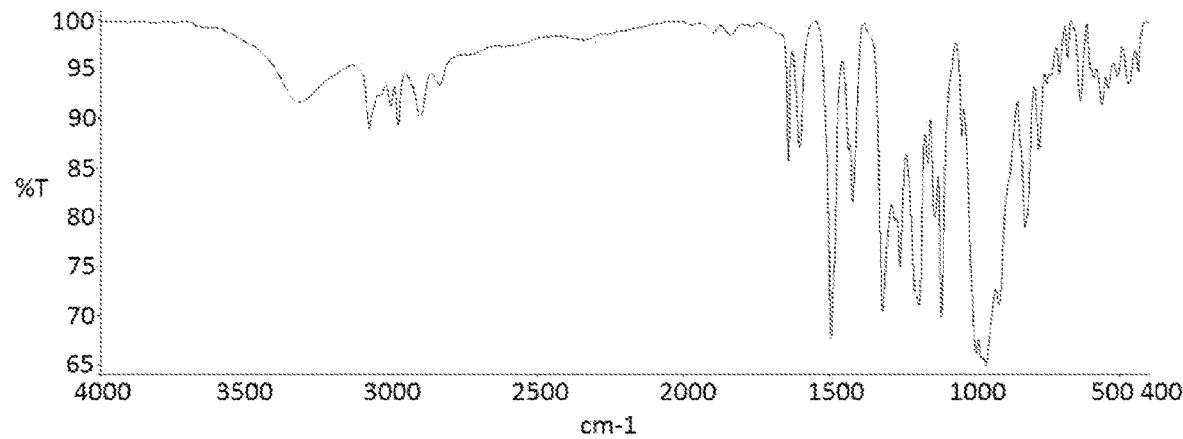
FIG. 1 illustrates the FTIR spectrum of the product made from Preparation Example 1.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having," "encompasses," "encompassing," or any other variant thereof is construed as an open-ended transitional phrase intended to cover a non-exclusive inclusion. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompasses," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

The following embodiments and examples are illustrative in nature and are not intended to limit the present disclosure and its application. In addition, the present disclosure is not bound by any theory described in the background and summary above or the following embodiments or examples.

As used herein, "or a combination thereof" means "or any combination thereof".

Unless otherwise specified, according to the present disclosure, a compound may include a monomer and/or a polymer. A mixture may include two or more compounds and may include a copolymer or auxiliaries, but not limited thereto.

As used herein, "vinyl group-containing" refers to the presence of an ethylenic carbon-carbon double bond (C=C) or a functional group derived therefrom in a compound, such as a reactive carbon-carbon double bond (C=C) functional group. Therefore, examples of "vinyl group-containing" may include, but not limited to, a structure containing a vinyl group, an allyl group or the like.

For example, a compound refers to a chemical substance formed by two or more elements bonded with chemical bonds and may be present as a monomer, a polymer, etc., but not limited thereto. Any compound disclosed herein is interpreted to not only include a single chemical substance but also include a class of chemical substances having the same kind of components or having the same property. In addition, as used herein, a mixture refers to a combination of two or more compounds.

As described above, a main object of the present disclosure is to provide a phosphorus-containing compound having a structure represented by the aforesaid Formula (1).

To a person having ordinary skill in the art, the phosphorus-containing compound of Formula (1), due to the presence of phosphorus atoms in the structure, will form a coke layer during heating and combustion to insulate combustibles against oxygen, providing a protective layer to the material to block oxygen; the phosphorus-containing compound can also capture free radicals formed during the combustion reaction to inhibit substance degradation to inhibit further combustion, thereby achieving the purpose of flame retardancy. In other words, the phosphorus-containing compound according to the present disclosure can serve as a phosphorus-containing flame retardant.

On the other hand, to a person having ordinary skill in the art, the phosphorus-containing compound of Formula (1), due to the presence of reactive functional groups in the structure (i.e., the terminal allyl groups), can react with other vinyl group-containing compounds, such as via a crosslinking reaction. In addition, the phosphorus-containing compound of Formula (1) can react with each other, such as via a self-crosslinking reaction. In other words, the phosphorus-containing compound according to the present disclosure can serve as a crosslinking agent.

In one embodiment, the phosphorus-containing compound according to the present disclosure comprises the phosphorus-containing compound of Formula (2), the phosphorus-containing compound of Formula (3) or a combination thereof.

On the other hand, also provided herein is a method of preparing the phosphorus-containing compound according to the present disclosure, comprising the following steps:
(1) reacting magnolol with phosphoryl chloride in a first alkaline environment to obtain an intermediate product; and
(2) reacting the intermediate product with a benzenediol in a second alkaline environment to obtain the phosphorus-containing compound.

In the preparation method disclosed herein, the first alkaline environment and the second alkaline environment can individually be achieved by conventional means used to create an alkaline condition. For example, the first alkaline environment and the second alkaline environment can individually be achieved by using same or different alkaline compound(s). Examples of the alkaline compound include, but not limited to, triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof.

For example, during the substitution reaction of the hydroxyl group on magnolol and the chloride atom on phosphoryl chloride, the alkaline environment is used to remove the hydrogen atom of the hydroxyl group on magnolol. Similarly, during the substitution reaction of the intermediate product and the benzenediol, the alkaline environment is used to remove the hydrogen atom of the hydroxyl group on the benzenediol.

In the step (2), the benzenediol preferably comprises resorcinol, hydroquinone or a combination thereof.

Unless otherwise specified, the preparation method disclosed herein can be carried out at any suitable temperature condition. For example, it is preferred that the step (1) and the step (2) are individually performed at a temperature range of 0° C. to 20° C., but not limited thereto. For example, the step (1) and the step (2) are individually performed at a temperature range of 0° C. to 20° C., 0° C. to 10° C. or 0° C. to 4° C., but not limited thereto.

To facilitate easy handling, the preparation method disclosed herein is preferably performed in solutions. For example, the step (1) is performed in the presence of a first solvent, and the step (2) is performed in the presence of a second solvent. In other words, the aforesaid magnolol, phosphoryl chloride, intermediate product or benzenediol may be dissolved with suitable solvents to prepare reaction solutions.

For example, the first solvent and the second solvent individually comprise toluene, tetrahydrofuran, acetone, butanone, propylene glycol methyl ether, dimethylformamide, dimethylacetamide, xylene or a combination thereof.

Unless otherwise specified, the amount of the aforesaid reactants is not particularly limited. For example, the molar ratio of magnolol and phosphoryl chloride is preferably between 2:1 and 1:2, and the molar ratio of the intermediate product and the benzenediol is preferably between 2:1 and 4:1. For example, the molar ratio of magnolol and phosphoryl chloride is preferably between 1.5:1 and 1:1.5, such as 1:1. For example, the molar ratio of the intermediate product and the benzenediol is preferably between 2:1 and 3:1, such as 2:1.

For example, in another embodiment, the aforesaid preparation method comprises the following steps:
preparing a tetrahydrofuran solution of magnolol;
at a temperature of 0° C. to 20° C., adding a first alkaline compound to the solution described in the previous step;
at a temperature of 0° C. to 20° C., adding a toluene solution of phosphoryl chloride to the solution described in the previous step to obtain the intermediate product;
preparing a tetrahydrofuran solution of benzenediol;
at a temperature of 0° C. to 20° C., adding a second alkaline compound to the tetrahydrofuran solution of benzenediol; and
adding the intermediate product to the solution described in the previous step to obtain the phosphorus-containing compound.

For example, in one embodiment, the first alkaline compound and the second alkaline compound individually comprise triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof, and the benzenediol comprises resorcinol, hydroquinone or a combination thereof.

For example, in another embodiment, the aforesaid preparation method comprises the following steps:
dissolving magnolol in tetrahydrofuran to obtain a magnolol solution and stirring the magnolol solution at a temperature of 0° C. to 20° C.;
at a temperature of 0° C. to 20° C., adding an alkaline compound to the magnolol solution to obtain a fifth solution;
dissolving phosphoryl chloride in toluene to obtain a phosphoryl chloride solution and stirring the phosphoryl chloride solution;
at a temperature of 0° C. to 20° C., adding the phosphoryl chloride solution to the fifth solution to obtain a sixth solution;
at a temperature of 0° C. to 20° C., stirring the sixth solution and reacting it for 10 to 14 hours (at a temperature of 0° C. to 20° C.) to obtain a precipitate;
washing the precipitate to remove impurities and drying it in a vacuum oven to obtain an intermediate product;
dissolving benzenediol in tetrahydrofuran to obtain a seventh solution, and at a temperature of 0° C. to 20° C., adding an alkaline compound to the seventh solution to obtain an eighth solution and stirring the eighth solution; and
at a temperature of 0° C. to 20° C., adding the intermediate product to the eighth solution and reacting for 8 to 14 hours (at a temperature of 0° C. to 20° C.) to obtain the phosphorus-containing compound of Formula (1).

In one embodiment, the alkaline compounds used in different steps may be the same or different and may individually comprise triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof. In one embodiment, the benzenediol comprises resorcinol, hydroquinone or a combination thereof.

In one embodiment, FTIR (Fourier-transform infrared spectroscopy), TLC (thin layer chromatography) or other known analysis techniques may be used to monitor the progress of the chemical reactions, such as monitoring the raw materials, the intermediate product or the phosphorus-containing compound of Formula (1). For example, FTIR, TLC or other known analysis techniques may be used to monitor the conversion rate or yield of the raw materials (magnolol, phosphoryl chloride or benzenediol); FTIR, TLC or other known analysis techniques may be used to monitor the conversion rate or yield of the intermediate product; or FTIR, TLC or other known analysis techniques may be used to monitor the conversion rate or yield of the phosphorus-containing compound of Formula (1).

In one embodiment, FTIR may be used to monitor the conversion rate of magnolol, such as by using FTIR to determine whether the signal indicating stretch vibration of OH group in the reaction solution at 2500 to 3500 cm$^{-1}$ has disappeared or not; if the signal indicating stretch vibration of OH group at 2500 to 3500 cm$^{-1}$ has disappeared, it means that magnolol in the raw materials is fully and completely reacted without leaving residual magnolol.

For example, in one embodiment, the reaction steps involved in the preparation method according to the present disclosure can be illustrated using the scheme below:

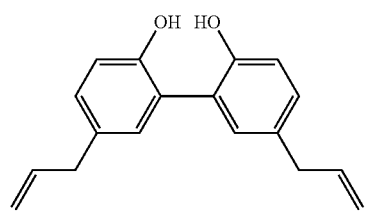

magnolol

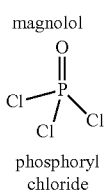

phosphoryl chloride

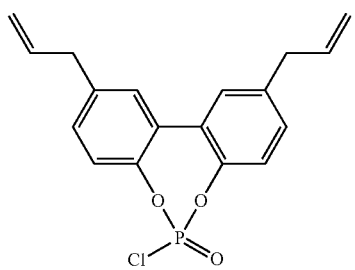

intermediate product

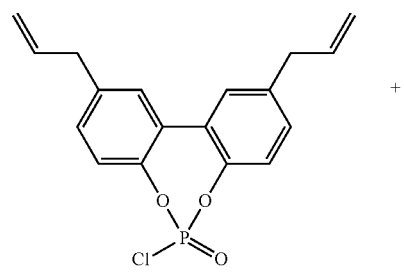

intermediate prodcut

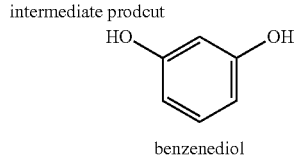

benzenediol

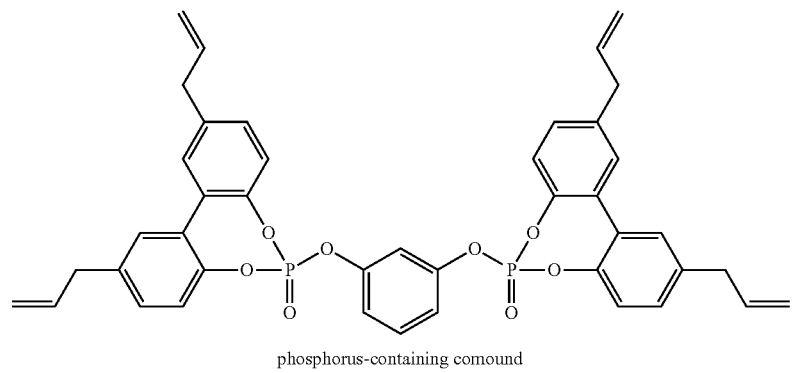

phosphorus-containing comound

In the scheme shown above, resorcinol is used as the exemplary reactant, and therefore the phosphorus-containing compound obtained will be the phosphorus-containing compound of Formula (2). In another embodiment, hydroquinone may be used as the reactant, and therefore the phosphorus-containing compound obtained will be the phosphorus-containing compound of Formula (3). In still another embodiment, both resorcinol and hydroquinone may be used as the reactants, and therefore the phosphorus-containing compound obtained will be a combination of the phosphorus-containing compound of Formula (2) and the phosphorus-containing compound of Formula (3).

Preparation of Phosphorus-Containing Compound

Preparation Example 1

In a three-necked reactor, 0.1 mole (26.33 g) of magnolol (a.k.a. 5,5'-diallyl-2,2'-biphenyldiol or 2,2'-bichavicol) was dissolved in 22 g of tetrahydrofuran to obtain Solution A. Solution A was cooled to a temperature range of 0° C. to 4° C. by such as iced water bath and then continuously stirred. 0.2 mole (20.25 g) of triethylamine (Et$_3$N) was added dropwise slowly to Solution A to obtain Solution B, which was then continuously stirred. 0.1 mole (15.33 g) of phosphoryl chloride was dissolved in 78 g of toluene to obtain Solution C. At a temperature range of 0° C. to 4° C., Solution C was added dropwise slowly to Solution B to obtain Solution D, which was then continuously stirred. At a temperature range of 0° C. to 4° C., Solution D was reacted for 10 to 14 hours, such as 12 hours, to obtain Precipitate E. Precipitate E was washed with toluene (at 0° C. to 20° C.) to remove impurities and then dried in a vacuum oven at 50° C. to 70° C. for 10 to 24 hours to obtain Product F, which is the intermediate product. Product F was weighed, and the yield of Product F was calculated to be 80% to 95%.

0.05 mole (5.51 g) of resorcinol was dissolved in 100 g of tetrahydrofuran to obtain Solution G. Solution G was cooled to a temperature range of 0° C. to 4° C. and then continuously stirred. Solution G was maintained at a temperature range of 0° C. to 4° C., and 0.1 mole (10.12 g) of triethylamine (Et$_3$N) was added dropwise slowly to obtain Solution H, which was then continuously stirred. 0.1 mole (34.36 g) of Product F was added to Solution H to obtain Solution I, during which the temperature was maintained at 0° C. to 4° C. Solution I was reacted for 8 to 14 hours, such as 8 to 12 hours, to obtain Precipitate J. Precipitate J was washed with tetrahydrofuran (at 0° C. to 20° C., preferably 0° C. to 10° C.) to remove impurities and then dried in a vacuum oven at 50° C. to 70° C. for 10 to 24 hours to obtain Product K, which is the phosphorus-containing compound of Formula (2). Product K was weighed, and the yield of Product K was calculated to be 85% to 95%.

Preparation Example 2

In a three-necked reactor, 0.1 mole (26.33 g) of magnolol was dissolved in 22 g of tetrahydrofuran to obtain Solution A. Solution A was cooled to a temperature range of to 4° C. by such as iced water bath and then continuously stirred. 0.2 mole (20.25 g) of triethylamine (Et$_3$N) was added dropwise slowly to Solution A to obtain Solution B, which was then continuously stirred. 0.1 mole (15.33 g) of phosphoryl chloride was dissolved in 78 g of toluene to obtain Solution C. At a temperature range of 0° C. to 4° C., Solution C was added to Solution B to obtain Solution D, which was then continuously stirred. A portion of Solution D was withdrawn and monitored by using FTIR or TLC, such that the reaction time may be adjusted according to the result of monitoring. At a temperature range of 0° C. to 4° C., Solution D was reacted for 14 hours to obtain Precipitate E. Precipitate E was washed with toluene (at 0° C. to 20° C., preferably 0° C. to 10° C.) to remove impurities and then dried in a vacuum oven at 50° C. to 70° C. for 10 to 24 hours to obtain Product F, which is the intermediate product. Product F was weighed, and the yield of Product F was calculated to be 85% to 95%.

0.05 mole (5.51 g) of hydroquinone was dissolved in 100 g of tetrahydrofuran to obtain Solution G, which was cooled to a temperature range of 0° C. to 4° C. and then continuously stirred. Solution G was maintained at a temperature range of 0° C. to 4° C., and mole (10.12 g) of triethylamine (Et$_3$N) was added dropwise slowly to obtain Solution H, which was then continuously stirred. 0.1 mole (34.36 g) of Product F was added to Solution H to obtain Solution I, during which the temperature was maintained at 0° C. to 4° C. A portion of Solution I was withdrawn and monitored by using FTIR or TLC, such that the reaction time may be adjusted according to the result of monitoring. Solution I was reacted for 14 hours to obtain Precipitate J. Precipitate J was washed with tetrahydrofuran (at 0° C. to 20° C.) to remove impurities and then dried in a vacuum oven at 50° C. to 70° C. for 10 to 24 hours to obtain Product K, which is the phosphorus-containing compound of Formula (3). Product K was weighed, and the yield of Product K was calculated to be 90% to 95%.

Analysis of Phosphorus-Containing Compound

Powder of Product K obtained from the Preparation Example 1 may be analyzed by the Fourier-transform infrared spectrometer (FTIR). A transmission type tool of the FTIR was used to measure the powder of Product K. During the measurement of the powder of Product K, potassium bromide powder was first dried in a 105° C. oven for 2 hours and then removed therefrom and placed in a sealed glass bottle for cooling to room temperature; after that, the powder of Product K was well mixed with the potassium bromide powder at a weight ratio of 1:100 and then tableted to form a sample suitable for the transmission FTIR test. The scanning wavelength of the transmission FTIR was set at a range of 400 to 4000 cm$^{-1}$, the resolution was set as 4 cm$^{-1}$, and the number of scanning was 10, so as to obtain the FTIR spectrum of Product K from the Preparation Example 1, as shown in FIG. 1.

Figure 2:
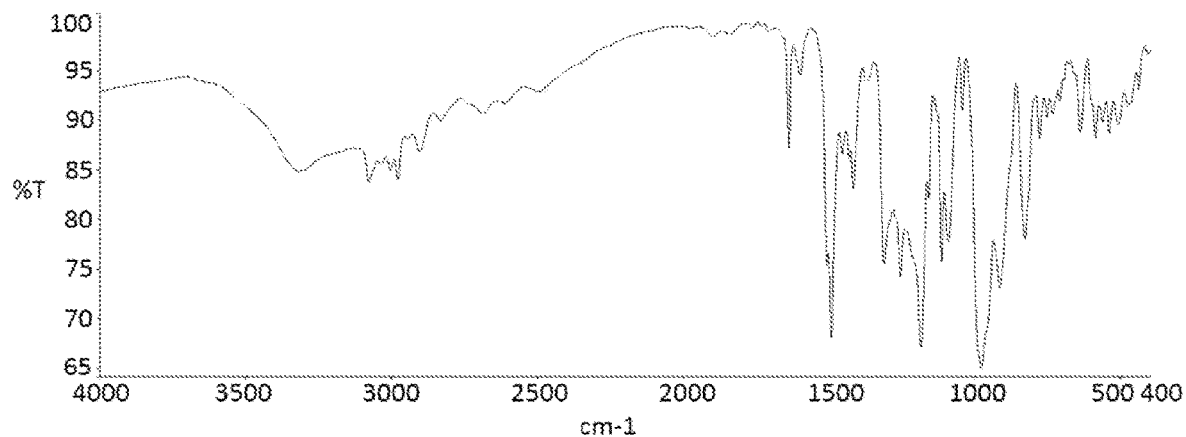
FIG. 2 illustrates the FTIR spectrum of the product made from Preparation Example 2.

In addition, Product K from the Preparation Example 2 was analyzed by FTIR following the processes described above, and the result is shown in FIG. 2.

From the FTIR results of Preparation Example 1 and Preparation Example 2, the intensity of characteristic peak at 2500 to 3500 cm$^{-1}$ can be used to determine that the product conversion rate of Preparation Example 1 is between 85% and 95% and that the product conversion rate of Preparation Example 2 is between 90% and 95%.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A phosphorus-containing compound having a structure represented by Formula (1):

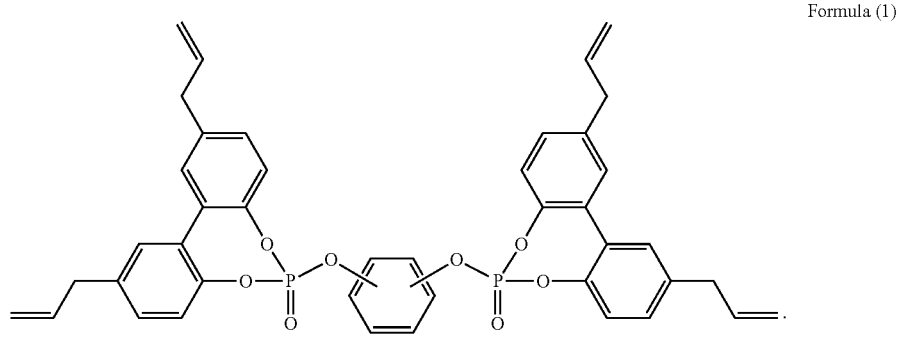

Formula (1)

2. The phosphorus-containing compound of claim 1, comprising a phosphorus-containing compound of Formula (2), a phosphorus-containing compound of Formula (3) or a combination thereof:

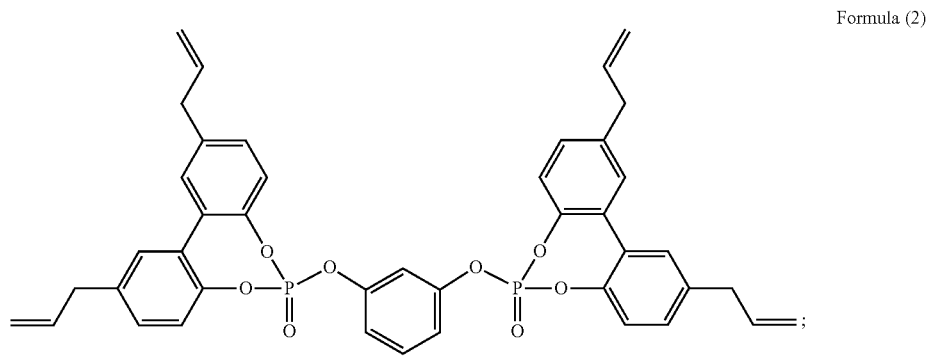

Formula (2)

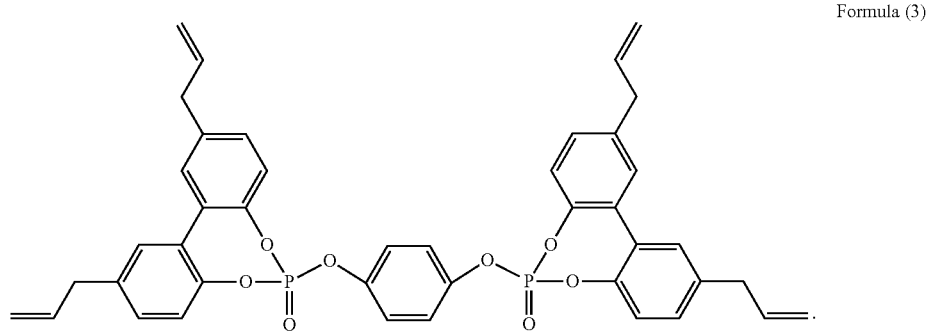

Formula (3)

3. A method of preparing the phosphorus-containing compound of claim 1, comprising:
 (1) reacting magnolol with phosphoryl chloride in a first alkaline environment to obtain an intermediate product; and
 (2) reacting the intermediate product with a benzenediol in a second alkaline environment to obtain the phosphorus-containing compound.

4. The method of claim 3, wherein the first alkaline environment and the second alkaline environment individually comprise triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof.

5. The method of claim 3, wherein the benzenediol is selected from resorcinol, hydroquinone or a combination thereof.

6. The method of claim 3, wherein the step (1) and the step (2) are individually performed at a temperature range of 0° C. to 20° C.

7. The method of claim 3, wherein the step (1) is performed in the presence of a first solvent, and the step (2) is performed in the presence of a second solvent.

8. The method of claim 7, wherein the first solvent and the second solvent individually are selected from toluene, tetrahydrofuran, acetone, butanone, propylene glycol methyl ether, dimethylformamide, dimethylacetamide, xylene or a combination thereof.

9. The method of claim 3, wherein the molar ratio of magnolol and phosphoryl chloride is between 2:1 and 1:2, and the molar ratio of the intermediate product and the benzenediol is between 2:1 and 4:1.

10. The method of claim 3, comprising the following steps:
at a temperature of 0° C. to 20° C., adding a first alkaline compound to a tetrahydrofuran solution of magnolol to obtain a first solution;
adding a toluene solution of phosphoryl chloride to the first solution to obtain the intermediate product;
at a temperature of 0° C. to 20° C., adding a second alkaline compound to a tetrahydrofuran solution of the benzenediol to obtain a second solution; and
adding the intermediate product to the second solution to obtain the phosphorus-containing compound.

11. The method of claim 3, comprising the following steps:
at a temperature of 0° C. to 20° C., adding a second alkaline compound to a tetrahydrofuran solution of the benzenediol to obtain a third solution;
at a temperature of 0° C. to 20° C., adding a first alkaline compound to a tetrahydrofuran solution of magnolol to obtain a fourth solution;
adding a toluene solution of phosphoryl chloride to the fourth solution to obtain the intermediate product; and
adding the intermediate product to the third solution to obtain the phosphorus-containing compound.

12. The method of claim 10, wherein the first alkaline compound and the second alkaline compound individually are selected from triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof; and the benzenediol is selected from resorcinol, hydroquinone or a combination thereof.

13. The method of claim 11, wherein the first alkaline compound and the second alkaline compound individually are selected from triethylamine, tripropylamine, triethanolamine, diethanolamine, ethanolamine, diisopropylamine, pyridine, sodium hydroxide, potassium hydroxide, sodium carbonate, potassium carbonate, sodium bicarbonate, potassium bicarbonate or a combination thereof; and the benzenediol is selected from resorcinol, hydroquinone or a combination thereof.

* * * * *